June 27, 1950  R. P. SWEGER  2,512,816
POWER TRANSMISSION MECHANISM
Filed Aug. 13, 1945
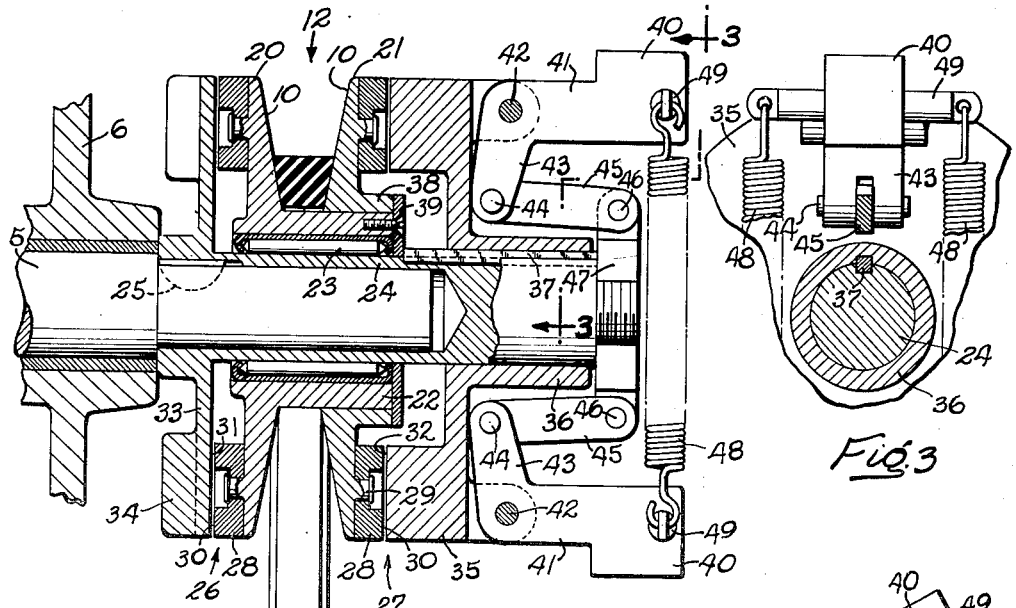
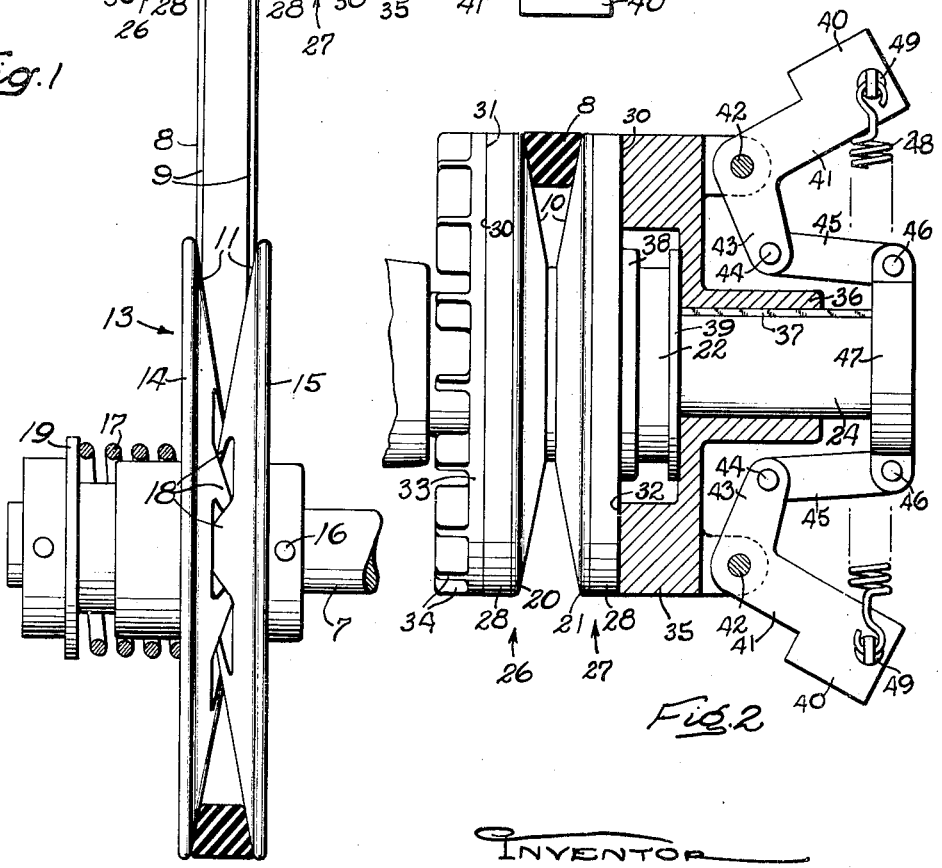
INVENTOR
Russell P. Sweger
By Carlson, Pitzner, Hubbard & Wolfe
ATTORNEYS Patented June 27, 1950

2,512,816

UNITED STATES PATENT OFFICE 2,512,816

POWER TRANSMISSION MECHANISM

Russell P. Sweger, Rockford, Ill.

Application August 13, 1945, Serial No. 610,612

7 Claims. (Cl. 74—230.17)

This invention relates to a V-belt drive, and the general object is to provide a novel centrifugally acting adjusted pulley construction which coacts with a V-belt to form an automatic clutch and an automatically variable transmission.

A more detailed object is to combine an axially engageable friction clutch with an adjustable diameter V-belt pulley for operation of the two in succession by a centrifugally acting means.

The invention also resides in the novel and compact arrangement of the parts for carrying out the foregoing objects.

Other objects and advantages of the invention will become apparent from the following detailed description taken in connection with the accompanying drawings, in which Figure 1 is a sectional view of the improved transmission taken diametrically of the belt pulleys.

Fig. 2 is a similar view of one of the pulleys with the parts in a different position.

Fig. 3 is a fragmentary section taken along the line 3—3 of Fig. 1.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

In the drawings, the invention is illustrated as a mechanism for transmitting rotary power from a drive shaft 5, which may be the main shaft of a prime mover 6 to a driven shaft 7 through the intermediary of an endless so-called V-belt 8 of standard rubber and fabric construction having inwardly converging side walls 9. The opposite end loops of the belt extend around grooves complementing the angle of the belt and respectively defined by conical surfaces 10 and 11 on two pulleys 12 and 13.

The pulley 13 operates to maintain a predetermined tautness of the belt and for this purpose is composed of two disks 14 and 15, the latter of which has a hub pinned at 16 to the driven shaft 7. The disks 14 and 15 have teeth 18 interlocking in all axial positions of the two disks, and the disk 14 is constantly urged axially toward the disk 15 by a compression spring 17 acting against a flange 19 fast on the driven shaft. The spring is stressed to urge the conical surfaces 11 together under sufficient pressure to expand the belt loop engaging the pulley and thereby maintain the belt under a predetermined tension. If this tension is exceeded, the belt wedges the disks apart and engages the latter at a smaller diameter.

The other pulley 12 comprises two disks 20 and 21 having the conical surfaces 10 formed on their adjacent sides and both rotatably supported by the driving shaft 5, the disk 21 always being disposed in the plane of the disk 15 of the pulley 13. An elongated hub 22 on the disk 20 projects through the disk 21 to support the latter, and in turn is supported by roller bearings 23 encircling a sleeve 24. The latter is received on the drive shaft 5 and is rigidly secured thereto by a key 25. The disk 20 is thus slidable axially toward and away from the disk 21. When the belt is disposed near the bottom of the groove 10, the loop at the other end of the belt will engage at the outer periphery of the groove 11 producing a speed reduction of one to fourteen, for example. A ratio of about one to five obtains when the pulley 12 is collapsed axially to cause the belt to ride the outer part of the groove 10, as shown in Fig. 2.

Rotary power is transmitted to the pulley 12 through a friction clutch whose gripping elements are concentric with the drive shaft and are adapted for axial engagement under an axially directed force which also collapses and expands the pulley 12. In the present instance, two clutches 26 and 27 are provided and located on opposite sides of the pulley 12 whose disks 20 and 21 constitute the driven clutch elements. For this purpose, flat rings 28 of wear-resisting material of the maximum diameter of the disks are secured as by pins 29 to the outer surfaces of the disks. The outwardly and axially facing surfaces 30 of these rings are adapted for gripping engagement with driving friction faces 31 and 32 which rotate with the drive shaft 5. One of these is on a flange 33 integral with the sleeve 24 and formed on its outer side with heat radiating ribs 34. The driving face 32 is on the end of an axially projecting flange 35 on a sleeve 36 slidable axially on the projecting end of the drive sleeve 24 and held against rotation relative to the latter by a key 37. The flange 35 is larger than the hub of the pulley disk 21 so as to permit collapse of the pulley by moving the sleeve axially toward the flange 33, this motion being limited by engagement of the end of the sleeve 36 with a ring 39 secured to the disk hub 22. Engagement of this ring with the end of the hub 38 limits the expansion of the pulley 12 to a position in which the disk 21 lies in the plane of the disk 15 of the pulley 13.

Means is provided for engaging the friction clutches in response to an increase in the speed of the drive shaft above a predetermined value and for maintaining the clutches ineffectual at lower speeds. Herein, this means acts centrifugally and comprises flyweights 40 mounted on the shiftable clutch element 36. To this end, the weights are on the outer ends of arms 41 pivoted on pins 42 between lugs on the back of the flange 35. Arms 43 project inwardly from the pivots 42 and their ends are pivotally connected at 44 to links 45. The latter project outwardly along the pulley axis, and are pivotally connected at 46 to a nut 47 screwed onto the end of the sleeve 24 and thereby made rigid with the drive shaft 5. Contractile springs 48 stretch between cross pins 49 on the flyweight arms 41, and tend to swing the latter about the pivots 44 and thereby retract the clutch flange 35 to the clutch released position shown in Fig. 1. The pulley 12 is thus allowed to expand fully, as shown, so that under the action of the spring 17 of the pulley 13, the belt 8 rides in the bottom of the groove 10. The transmission is thus conditioned for maximum speed reduction between the driving and driven shafts.

The springs 48 overcome the centrifugal force acting on the flyweights and hold the clutch elements thus released until the speed of the drive shaft has increased above a predetermined value, for example, 2,000 R. P. M. If this speed is approached, the flyweights move outwardly, thereby swinging the bell cranks about the pivots 44 and correspondingly moving the friction element 35 inwardly. When the clutch clearance is taken up, the faces of both clutches are brought into gripping engagement, the driven faces 30 being held apart by the belt. Rotation of the pulleys is then initiated by a torque which is proportional to the drive shaft speed. As the speed, and therefore the centrifugally derived force rises above a value sufficient to overcome the tension applied to the belt by the pulley 13, the pulley 12 starts to collapse and the belt works outwardly along the surfaces 10. This results in the progressive increase in the effective diameter of the drive pulley 12 and a corresponding decrease in the speed reduction ratio up to the limit illustrated by the position of the parts shown in Fig. 2. As a result, the drive ratio is varied automatically with speed changes resulting from changes in load, the resultant effect being to maintain an approximately constant speed of the drive shaft 5. When the drive shaft speed is decreased as by an increase in loading of the shaft 7, the ratio is correspondingly increased. If the drive shaft speed is decreased intentionally to the predetermined value, the clutches 26 and 27 will become disengaged, thereby interrupting the transmission of power to the pulley 12.

The transmission mechanism above described forms a combined automatic clutch and variable ratio drive which is especially useful in driving widely varying loads by internal combustion engines. It enables a prime mover of minimum size and operating economy to be used, and at the same time provides for starting and interrupting the transmission of power simply by selectively varying the speed of the drive shaft. The parts of the clutches and the pulley 12 are compactly arranged and may, as shown, be carried directly on the projecting end of the prime mover shaft.

I claim as my invention:

1. In a transmission, the combination of a rotary drive shaft, two cone elements rotatably mounted on said shaft for axial movement relative to each other and having opposed conical surfaces coacting to form a V-belt groove, friction faces on the respective elements axially facing in opposite directions, friction members on opposite sides of said elements rotatable with said shaft and respectively engageable with said faces, said members normally tending to separate and being mounted for axial movement relative to each other to grip or release said faces, and centrifugally acting means responsive to the speed of said shaft and operable upon an increase in the shaft speed to move said members into gripping engagement with said faces and then to urge said elements together under progressively increasing pressure.

2. In a transmission, the combination of a rotary drive shaft having a flange rigid therewith, a disk splined on said shaft, two cone elements rotatably mounted on said shaft between said flange and disk and having friction faces axially engageable with said flange and disk respectively, said elements being relatively movable axially and coacting to form a groove for a V-belt, means yieldably urging said disk away from said flange, and flyweights carried by said disk and operable upon an increase in the speed of said shaft to move said disk toward said flange under progressively increasing pressure.

3. In a transmission, the combination of two rotatable coned elements coacting to provide a V-belt groove and relatively movable axially to vary the width of said groove, a friction clutch having coacting driving and driven members mounted for movement relative to each other axially of said elements and having opposed axially facing surfaces frictionally engageable with each other, one of said members being rotatable and axially movable with one of said elements, a flyweight movable radially and outwardly in response to an increase in the speed of said driving clutch member, and mechanism actuated by the outward movement of said flyweight to shift said driving clutch member into engagement with the driven clutch member and thereby engage said clutch at a predetermined speed and then to compress said elements together under increasing force as the speed of said driving member increases further.

4. In a transmission, the combination of an axially collapsible V-belt pulley, a friction clutch having rotary driving and driven members engageable by a force directed axially of said pulley in the direction of collapse thereof, said driven member being rotatable with said pulley, means normally acting to expand said pulley and disengage said clutch members, and a rigid flyweight rotatable with said driving clutch member and spring urged radially inwardly, said flyweght moving radially outwardly as the speed of said driving member increases, and mechanism for converting said outward motion of said flyweight into a force applied axially of said members and acting in a direction to successively engage said clutch and then collapse said pulley under progressively increasing pressure.

5. In a transmission, the combination of a rotary drive shaft, an axially collapsible V-belt pulley rotatably supported by said shaft, a rotary friction clutch for driving said pulley having a driving element axially movable on said shaft and having a friction surface facing axially toward said pulley, said clutch having a driven element rigid with a part of said pulley and having an axially facing friction face opposed to and engageable with said driving face, means normally disengaging said clutch, and centrifugally acting means rotatable with said shaft and operating in response to an increase in the speed thereof to produce a force directed axially to engage said clutch and then apply a progressively increasing pressure tending to collapse said pulley, said last mentioned means including a flyweight movable radially with changes in the speed of said shaft and a member pivotally supporting said flyweight and operable during outward movement of the flyweight to move said driving clutch element axially toward said pulley.

6. In a transmission, the combination of a V-belt pulley having two rotatable coned elements coacting to form a groove for receiving a V-belt and relatively movable axially to vary the width of said groove, a friction clutch having axially engaging driving and driven members, the driven member being rotatable and axially movable with one of said coned elements, a rigid flyweight rotatable with said driving clutch member and movable inwardly and outwardly as the speed of the driving member decreases and increases respectively, and a motion transmitting connection between said flyweight and said driving clutch member operating to convert the outward movement of the flyweight into axial movement of said driving member to move the latter continuously first into gripping engagement with said driven clutch member and then to move both of said members to collapse said pulley and narrow said groove.

7. In a transmission, the combination of a V-belt pulley having two rotatable coned elements coacting to form a groove for receiving a V-belt and relatively movable axially to vary the width of said groove, a friction clutch comprising members having opposed axially facing frictional surfaces one rigid with a movable one of said pulley elements, the other member being mounted to rotate with said pulley elements and to shift axially of the pulley, a flyweight pivoted on the driving clutch element for radial movement inwardly and outwardly as the speed decreases and increases respectively, and means coacting with a part of said flyweight to hold the latter against axial movement and thereby cause the centrifugally derived force to be applied to the flyweight pivot for shifting said driven clutch element axially.

RUSSELL P. SWEGER.

REFERENCES CITED

The following references are of record in the file of this patent:

UNITED STATES PATENTS

| Number | Name | Date |
| --- | --- | --- |
| 1,618,644 | Dickson | Feb. 22, 1927 |
| 2,215,831 | Heyer | Sept. 24, 1940 |
| 2,260,795 | Burns | Oct. 28, 1941 |
| 2,283,267 | Kohl | May 19, 1942 |
| 2,336,002 | Everett | Dec. 7, 1943 |

FOREIGN PATENTS

| Number | Country | Date |
| --- | --- | --- |
| 237,353 | Great Britain | July 27, 1925 |